A. H. HALL.
MECHANISM FOR STACKING AND CONVEYING TOOTHPICKS.
APPLICATION FILED APR. 24, 1911.
1,024,774.
Patented Apr. 30, 1912.
6 SHEETS—SHEET 3.
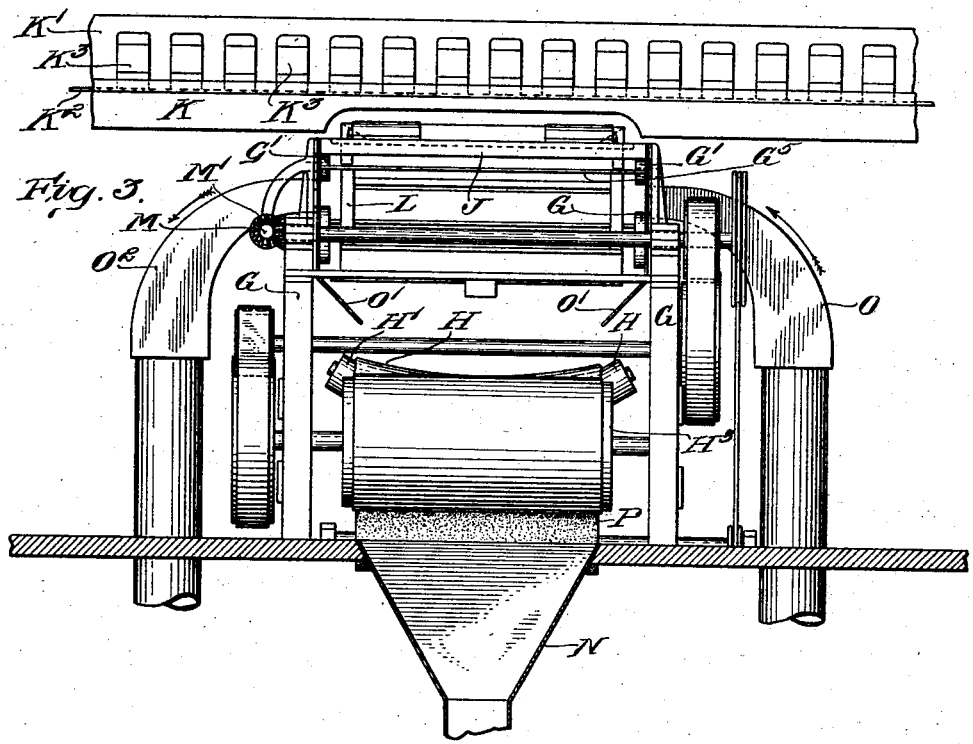

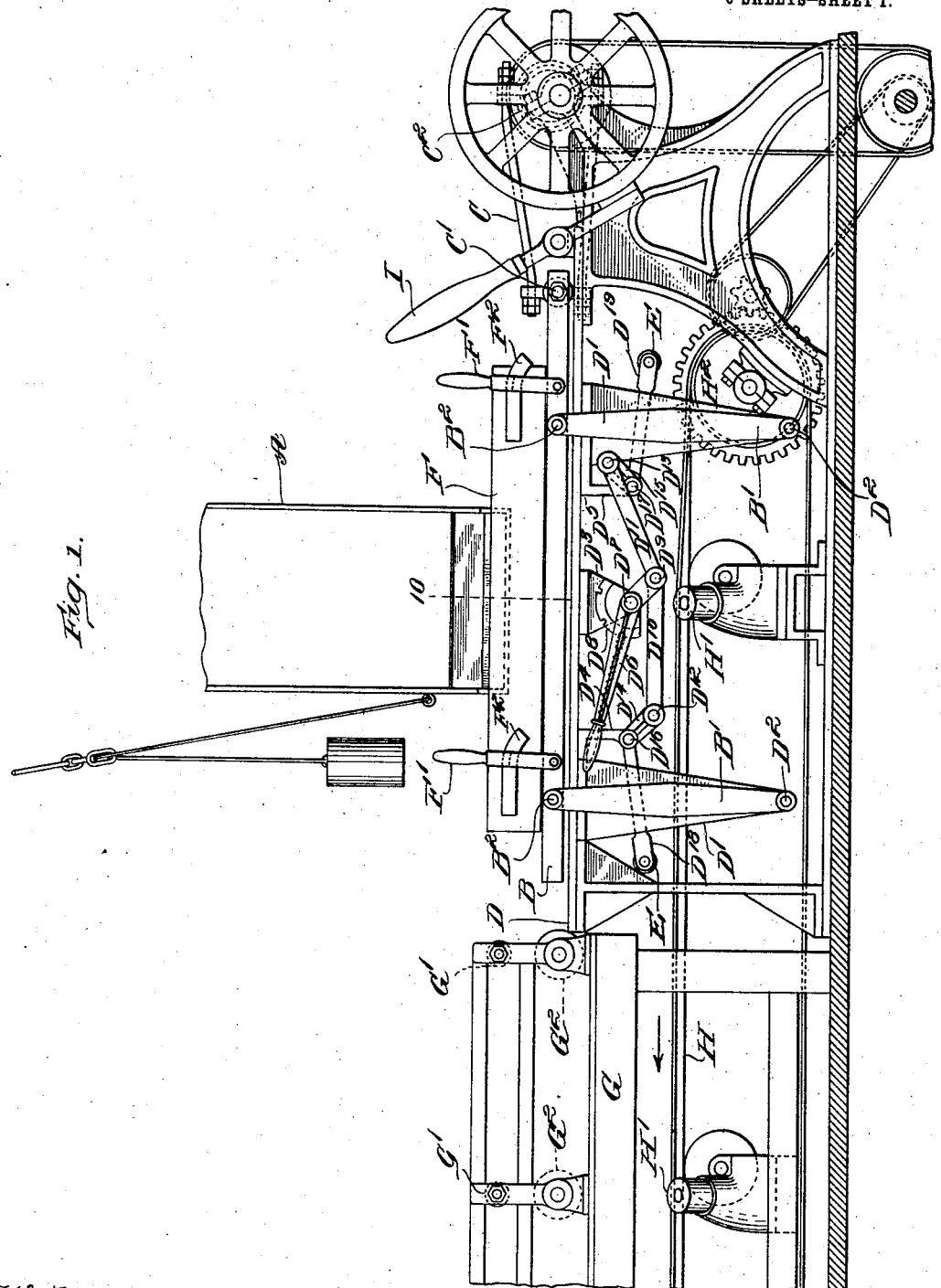

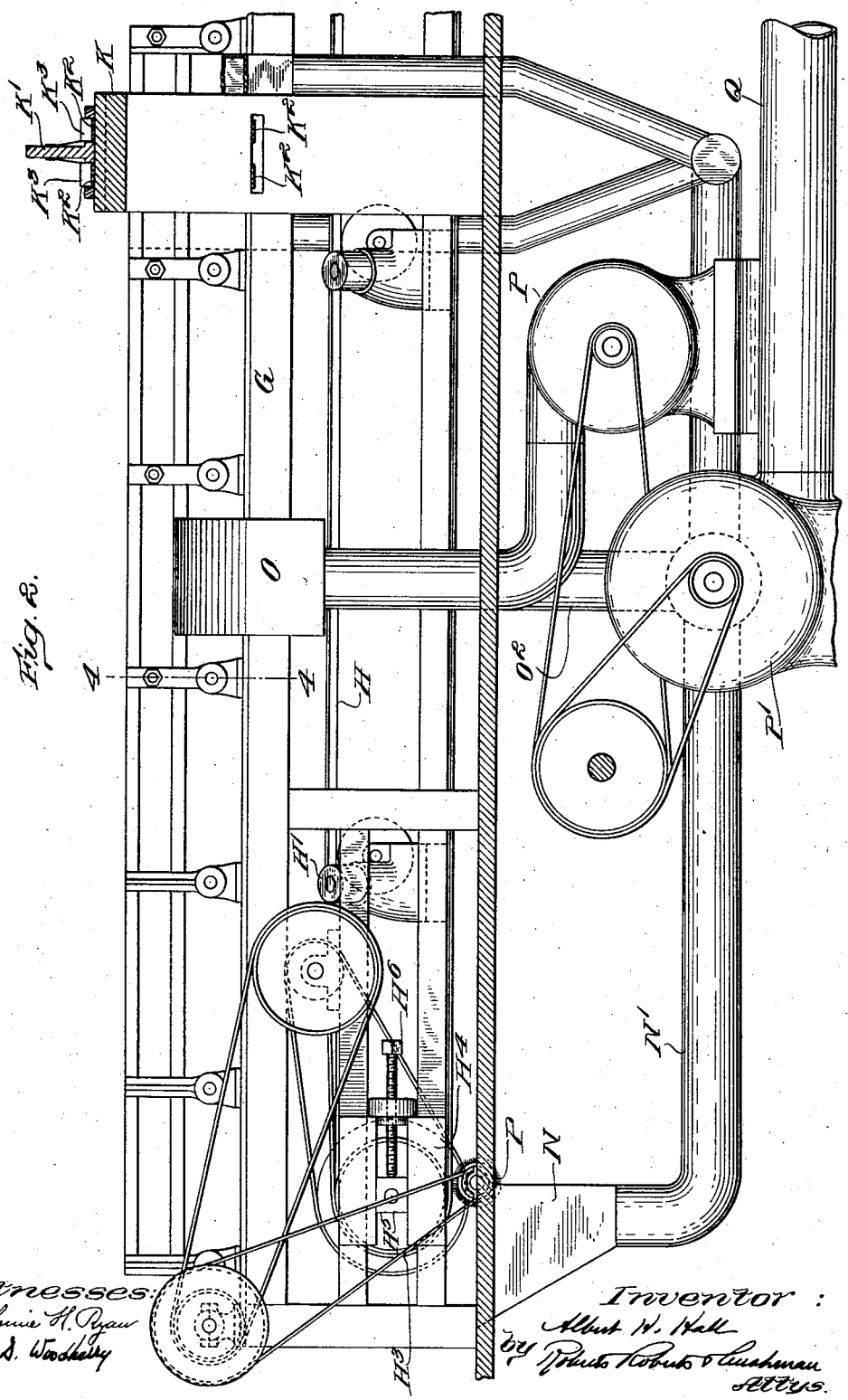

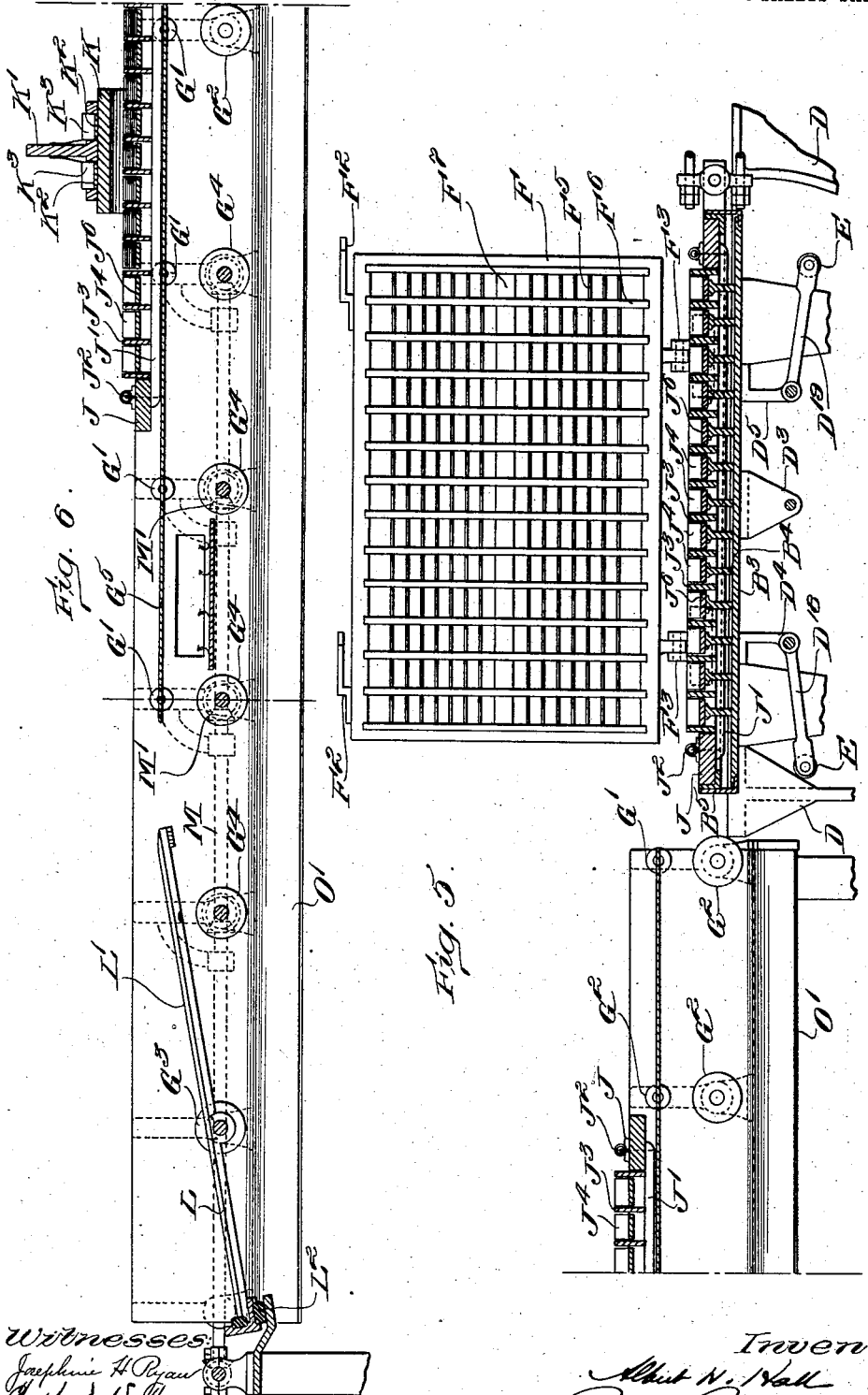

A. H. HALL.
MECHANISM FOR STACKING AND CONVEYING TOOTHPICKS.
APPLICATION FILED APR. 24, 1911.
1,024,774.
Patented Apr. 30, 1912.
6 SHEETS—SHEET 5.
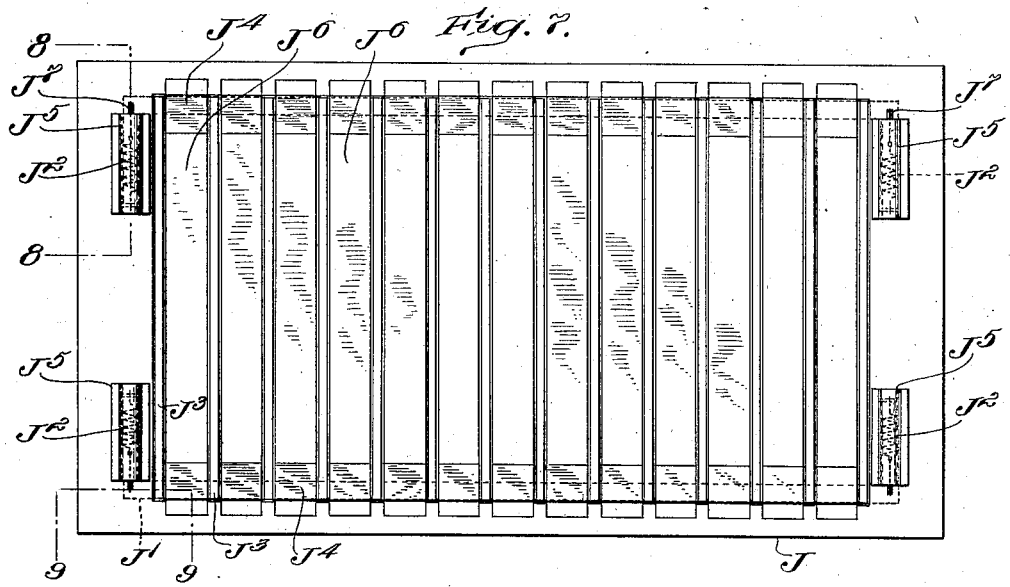
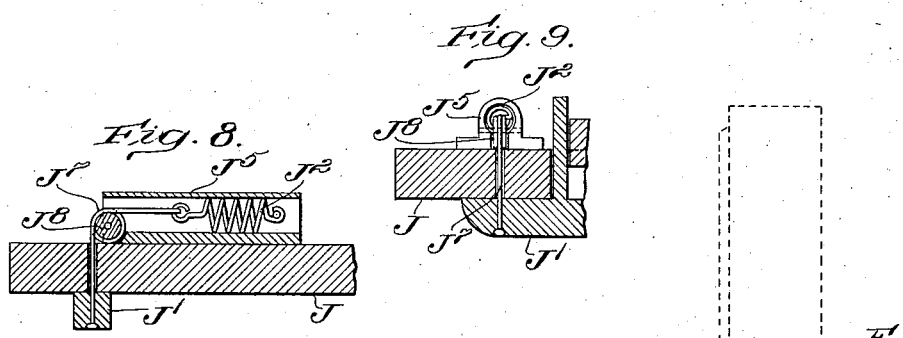
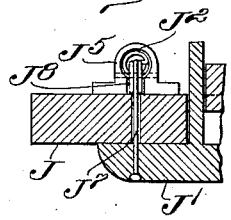
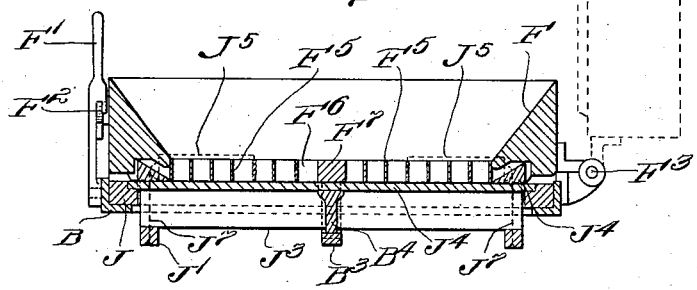
Witnesses:
Josephine H. Ryan
Charles D. Wickbery
Inventor:
Albert H. Hall
by Roberts Roberts & Cushman
Attys.

A. H. HALL.
MECHANISM FOR STACKING AND CONVEYING TOOTHPICKS.
APPLICATION FILED APR. 24, 1911.
1,024,774.
Patented Apr. 30, 1912.
6 SHEETS—SHEET 6.
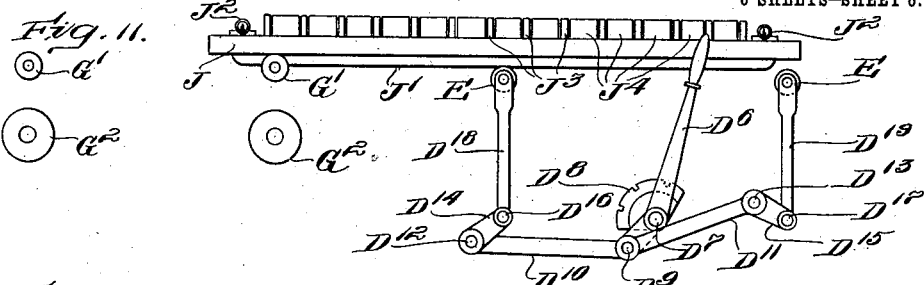
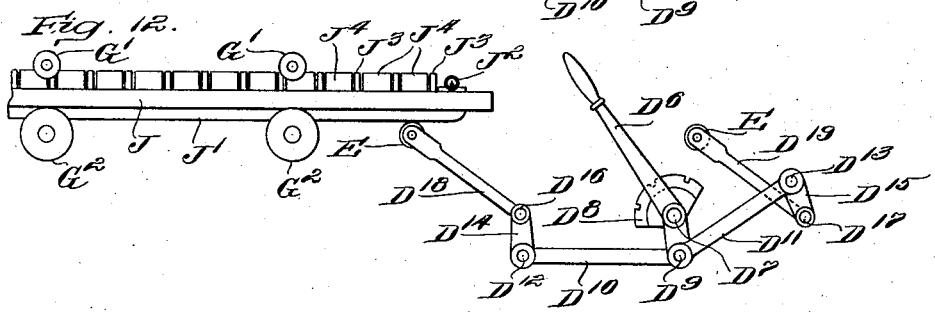
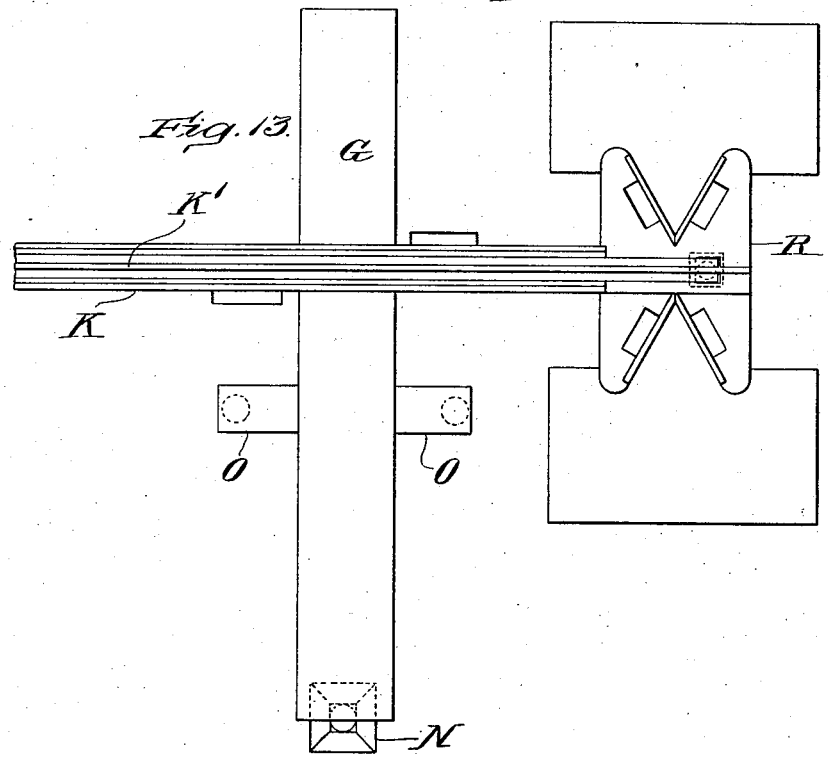

UNITED STATES PATENT OFFICE.

ALBERT H. HALL, OF PERU, MAINE, ASSIGNOR TO FORSTER MANUFACTURING COMPANY, OF DIXFIELD, MAINE, A CORPORATION OF MAINE.

MECHANISM FOR STACKING AND CONVEYING TOOTHPICKS.

1,024,774. Specification of Letters Patent. Patented Apr. 30, 1912.

Application filed April 24, 1911. Serial No. 622,904.

*To all whom it may concern:*

Be it known that I, ALBERT H. HALL, a citizen of the United States, and resident of Peru, in the county of Oxford and State of Maine, have invented new and useful Improvements in Mechanism for Stacking and Conveying Toothpicks, of which the following is a specification.

My invention relates to the manufacture of wooden toothpicks and similar articles, and has for its object the provision of mechanism for arranging such objects as toothpicks in conveniently disposed piles or stacks from which they may be taken to be packed in boxes, and for conveying and transferring supplies of such articles properly stacked to a convenient location for packing and for automatically restoring the toothpick carriers to the neighborhood of the stacking machine.

In the drawings hereto annexed which illustrate an example of my invention,—Figure 1 is a longitudinal elevation of the stacking end of a toothpick stacking and conveying machine; Fig. 2 is a longitudinal elevation in continuation of Fig. 1 showing the packing station and dust and waste removing devices; Fig. 3 is an end elevation viewed from the left hand end of Fig. 2; Fig. 4 is a vertical cross section at the line 4—4 of Fig. 2; Fig. 5 is a longitudinal view, partly in section, along the median line of the toothpick stacking devices; Fig. 6 is a similar longitudinal and sectional view of the conveying and transferring mechanism; Fig. 7 is a plan view of a toothpick tray; Fig. 8 is a detail, on an enlarged scale, showing a section taken on the line 8—8 of Fig. 7; Fig. 9 is a detail in section on the line 9—9 Fig. 1; Fig. 10 is a vertical cross section showing the toothpick stacker in position on the toothpick tray; Fig. 11 is a detail showing the tray lifting and transferring devices in one position; Fig. 12 shows the tray lifting and transferring devices in another position; and Fig. 13 is a general plan view, diagrammatic in character, showing the arrangement of the tray-conveyer and the box carrier.
Referring to Fig. 1, A represents the lower end of a spout or chute through which such objects as toothpicks may be delivered at will into the stacker presently to be described. The delivery end of the chute A
is counterweighted as indicated and articu-
lated in any convenient manner so that it may be lifted and lowered as desired.

B represents a rectangular vibrator frame pivotally connected to and supported on the arms B' by the pivots B$^2$, the arms B' being supported on pivot pins D$^2$ secured to hangers D' which form part of the main frame D of the machine. The vibrator, represented by the frame B, is connected by means of the eccentric rods C and connections C' with an eccentric C$^2$, the rotation of which imparts a horizontal vibratory movement to the vibrator. Adjacent to the vibrator and the main frame on which it is mounted, there is arranged the way frame G which provides upper and lower ways in which the toothpick trays, presently to be described, travel outward from the vibrator and inward to the vibrator in returning. The stacker F is movably mounted on the vibrator frame B and is provided with means wherewith it may be locked to the vibrator, such means being represented by the offset arms F$^2$ which engage with the locking levers F'. Below the vibrator and attached to the main frame D of the machine, there is arranged a tray handling mechanism which is shown separately and more clearly in Figs. 11 and 12 and will be described in connection with those figures. Below the way frame and vibrator frame there extends an endless belt H carried at one end by the drum H$^2$ and supported and raised along its edges by the inclined rolls H'; this belt is given a travel in the direction of the arrow shown in Fig. 1 and serves to collect spilled toothpicks and to pass them into the storing conveyer as will hereinafter be described.

Referring now to Fig. 2, which is a continuation of Fig. 1, K represents a bridge which stands transverse to the way frame G and on which box conveying belts K$^2$ at either side of the partition K', carry toothpick boxes K$^3$ to be filled by attendants. The belt H continues under the way frame G and passes over the roll H$^3$ which is mounted in a sliding journal H$^5$ which is adjustable in ways H$^4$ and held by an adjusting screw H$^6$. Immediately below the roll H$^3$ the opening of the return funnel N is shown. This return funnel leads to the pipe N' which communicates with a blower P' in such manner that light objects like toothpicks will be drawn through the pipe

N' and driven through the pipe Q and thence carried to a suitable receptacle.

In Fig. 3 the machine is shown in end elevation as viewed from the left of Fig. 2 and in this figure a toothpick tray J is shown as standing in the upper or outgoing way on the tray frame. The blower pipes O and $O^2$ are arranged to cause a strong draft across the lower way in the way frame G, the blast from the pipe O coming from the blower P (see Fig. 2) while the pipe $O^2$ is a suction pipe and communicates with the suction blower P' (Fig. 2).

The two ways of the way frame G are provided with rollers. The rollers G', on which the toothpick tray travels on its way from the vibrator, afford merely passive support on which the tray rolls. The tray carrying rolls in the lower or return way shown at $G^4$ in Figs. 3, 4 and 6 are driven so as actively to propel a toothpick tray resting thereon back toward the vibrator. The last two tray supporting rolls in the lower way are shown at $G^2$ (Figs. 1 and 5) and these are idlers or passively supporting rolls on which the toothpick tray may rest until it is drawn out of the lower way.

From that end of the way frame which is adjacent to the vibrator and to the point where a toothpick tray is transferred from the upper way to the lower, the two ways are separated by a horizontal partition shown at $G^5$ in Figs. 3, 4, 5 and 6. The lower way is also housed by means of the side plates O' which slant inwardly at their lower edges so as to direct falling objects upon the traveling belt H below.

Referring to Fig. 6, L is a pivoted cradle which represents the means for transferring a toothpick tray from the upper way into the lower way. This cradle L is pivotally mounted on the shaft of the roll $G^3$ and the inner end L' of the cradle is longer than the outer. The outer is loaded as by a weight $L^2$ so that the longer inner end is normally elevated in position to receive a toothpick tray rolling to it on the idler rolls G'. The weight of a toothpick tray upon the cradle overbalances the weight $L^2$ causing the cradle to rock downward at the end L' and thus to lower the toothpick tray into contact with the moving and driving rolls $G^4$ which are actuated by bevel gear connections M' from the shaft M, and these rolls $G^4$ propel the tray inward toward the vibrator causing it to come to rest finally upon the idler rolls $G^2$.

The course of a toothpick tray after the picks have been properly stacked upon it is as follows: From the vibrator shown in Fig. 1 it is lifted to the passively supporting idler rolls G' in the upper way and rolled outward until it comes to the bridge K where the attendants remove the picks from the tray packing them in boxes $K^3$ as the latter move with the belts $K^2$. When the tray has been emptied of picks the attendants roll it outward still farther to and upon the tilting cradle L which tips down under the weight of the tray, lowering the latter upon the rotating rolls $G^4$. Then the tray passes inward under the partition $G^5$ through the transverse blast of air proceeding from the pipe O and entering the pipe $O^2$, and thence to the idler rolls $G^2$ where it awaits the time when it shall be again placed upon the vibrator.

The mechanism for handling toothpick trays at the vibrator end of this machine consists of the system of levers and links which are mounted on the hangers $D^3$, $D^4$ and $D^5$ secured to the machine frame and seen on Fig. 1. In Figs. 11 and 12 this handling mechanism is shown in two positions, in Fig. 11 in the position for transferring a tray loaded with picks to the outgoing way provided with the idler rolls G'. The lever $D^6$ which constitutes the handle is pivoted at $D^7$ upon the notched sector $D^8$. At $D^9$ the links $D^{10}$ and $D^{11}$ are pivoted and at their outer ends are pivotally secured at $D^{12}$ and $D^{13}$ to the short arms $D^{14}$ and $D^{15}$ of the elbow levers $D^{18}$ and $D^{19}$ on the outer ends of which are mounted the antifriction rolls E. In Fig. 1 this lifting and handling system is shown in its retracted and inactive position. When a tray on the vibrator has been filled, the handle $D^6$ is freed from engagement with the notched sector and swung to the right. This brings the rolls E into contact with the rails J' on the tray J lifting the tray to such a level that a horizontal movement on the rolls E will transfer the tray to the rolls G' in the outgoing way of the way frame. In Fig. 12 an empty tray is seen emerging from the incoming way on the rolls $G^2$. To receive the tray the system of levers is moved to mid position, the arm $D^6$ being locked in the notched sector and the rolls E being at the proper level to receive the tray as it is rolled out of the way frame and is thus transferred from the rolls $G^2$ to the rolls E. When the tray is in proper position over the vibrator frame the handle $D^6$ is disengaged from the notched sector and moved down to the position shown in Fig. 1 lowering the tray into position on the frame B.

The tray and stacking mechanism which I prefer to employ are shown in detail in Figs. 5 to 10 inclusive. The tray consists of the frame J (see Fig. 7) rectangular in form, and slats $J^6$ which constitute the bottom of the tray on which the toothpicks rest. These slats are so spaced that the bottom of the tray is slotted transversely and in these transverse slots the vertically disposed slats $J^3$ are located. These slats $J^3$ are secured to longitudinal rails J' which together with the slats form an independent framework. Inclined blocks J⁴ having the same width as the transverse bottom slats J⁶ are secured along the sides of the tray. The rails J' are yieldingly held in position by means of cords J⁷ which run over pulleys J⁸ and are secured to springs J² arranged in tubular housings J⁵. Four of such lifting springs are provided and the effect of their tension is to hold the rails J' close up against the under side of the tray J and thus constantly to urge the vertical slats J³ upward. By this means the tray is transversely divided into compartments of each of which the ends are the blocks J⁴ and the two sides are the slats J³. The tray J is so proportioned that it substantially fits and rests upon the vibrator frame B. When the tray is in place on the frame the stacker is then brought down upon it in the following manner: The stacker is a rectangular frame F hinged at F³ to the vibrator frame B. The stacker F is divided transversely by partitions F⁶ which are placed and spaced so as to register with the vertical slats J³ of the tray J. The stacker is longitudinally divided by partitions F⁵ and has a central stiffening bar F⁷. When the stacker F is swung down upon the tray, the vertical slats J³ are forced down against the tension of the springs J² until the bottom of the stacker comes to rest upon the transverse bottom slats J⁶ of the tray J. Then the locking arms F' are swung upward into engagement with the offset cam bars F² locking the stacker and tray firmly together and to the vibrator. Then a supply of toothpicks is drawn from the chute A and spread out in the stacker F, the vibrating mechanism is set in motion by the shipper lever I (Fig. 1) and the vibrating motion of the stacker causes the picks to arrange themselves in each compartment formed by the partitions F⁵ and F⁶ and this is continued until these compartments are filled with toothpicks, all of which, by reason of the fact that the distance between each two adjacent longitudinal partitions is less than the length of a toothpick, are uniformly and regularly stacked parallel to the partitions F⁵. When the desired supply of picks has thus been stacked, the stacker F is unlocked and swung upward. The vertical slats J³ follow the transverse partitions F⁶ as the latter rise, and take their place, so that the evenly stacked toothpicks are prevented from being dislodged from their proper arrangement.

The above described tray and stacker mechanism forms the subject matter of an application for patent filed concurrently herewith by me, Serial No. 622,668 and is reserved for claim therein. It constitutes the preferred form of stacker and tray, although other forms of stackers or trays might be employed with the handling and conveying mechanism hereinabove described.

The general arrangement of the mechanism is shown in Fig. 13 where G represents the way frame and K the bridge along which the box-conveying belts K travel conveying the filled boxes to a convenient station R where the box covers can be folded in by attendant workmen.

The blast apparatus shown in Figs. 2, 3 and 4 and hereinabove described removes from the tray on its way toward the vibrator all loose toothpicks which may have remained thereon. Some of these stray toothpicks find their way through the pipe O² and thence through blower P' to the pipe Q; others fall from the inclined plates O' on to the belt H and fall into the funnel N passing through the pipe N' to the blower P'. If any picks are spilled at any point in the machine they will fall upon the conveyer belt H and be delivered to the restoring mechanisms which convey the picks to some point where they may be collected and again carried to the supply.

I claim:

1. In a machine of the character described, the combination with a support for a tray or the like, of a way-frame adjacent to the support, having two ways, one an outgoing way adapted to receive a tray from the support, the other an ingoing way provided with active tray-propelling means directed toward the support, and transferring means at the end of the ways remote from the support, automatically responsive to the weight of a tray, to transfer a tray from the outgoing way to the propelling means of the ingoing way.

2. In a machine of the character described, the combination with a support for a tray or the like, of a way-frame adjacent to the support, having two ways, one an outgoing way adapted to receive a tray from the support, the other an ingoing way provided with active tray-propelling means directed toward the support except at the end adjacent to the support, and having passive tray holders at that end and transferring means at the end of the ways remote from the support, automatically responsive to the weight of a tray, to transfer a tray from the outgoing way to the propelling means of the ingoing way.

3. In a machine of the character described, the combination with a support for a tray or the like, of a way-frame adjacent to the support, having two ways, one adapted to receive a tray from the support, the other provided with active tray-propelling means directed toward the support, and a pivoted cradle automatically responsive to the weight of a tray to transfer a tray from the outgoing way to the propelling means of the ingoing way.

4. In a machine of the character described, the combination with a support for a tray or the like, of a way-frame adjacent to the support, having two ways, one an outgoing way adapted to receive a tray from the support, the other an ingoing way provided with active tray-propelling means directed toward the support, and transferring means at the end of the ways remote from the support, automatically responsive to the weight of a tray, to transfer a tray from the outgoing way to the propelling means of the ingoing way and a tray lifter having tray holding members movable from the level of the ingoing way to a level above the said support.

Signed by me at Dixfield, Maine, this 14th day of April, 1911.

ALBERT H. HALL.

Witnesses:
NATHANIEL B. WOODSUM,
BLANCHE J. BISHOP.

Copies of this patent may be obtained for five cents each, by addressing the "Commissioner of Patents, Washington, D. C."